United States Patent [19]
Harper

[11] Patent Number: 5,435,097
[45] Date of Patent: Jul. 25, 1995

[54] TREE STABILIZER APPARATUS, AND METHODS OF CONSTRUCTING UTILIZING SAME

[76] Inventor: Doug O. Harper, Rte. 1 Box 143, Sardis, Miss. 38666

[21] Appl. No.: 203,271

[22] Filed: Feb. 28, 1994

[51] Int. Cl.⁶ .............................................. A01G 7/00
[52] U.S. Cl. ....................................... 47/43; 248/156; 248/229
[58] Field of Search ............ 47/43 R; 248/229, 225.31, 248/156

[56] References Cited

U.S. PATENT DOCUMENTS

| | | |
|---|---|---|
| 2,501,255 | 3/1950 | Bell . |
| 2,780,869 | 2/1957 | Long .................... 248/156 |
| 3,010,256 | 11/1959 | Ise . |
| 3,185,509 | 5/1965 | Welsher et al. ............ 248/229 |
| 3,223,467 | 12/1965 | Jafelice .................. 248/225.31 |
| 3,505,761 | 4/1970 | Prieur .................... 248/229 |
| 3,521,401 | 7/1970 | Shisler . |
| 4,061,301 | 12/1977 | Catena ................... 248/156 |
| 4,299,052 | 11/1981 | Staudt . |
| 4,307,540 | 12/1981 | Reisner . |
| 4,480,403 | 11/1984 | Williams . |
| 4,664,771 | 5/1987 | Docktor et al. ........... 248/229 |
| 4,738,050 | 4/1988 | Dickinson ................ 47/43 R |

Primary Examiner—Ramon S. Britts
Assistant Examiner—Joanne C. Downs
Attorney, Agent, or Firm—Weiner, Carrier & Burt; Joseph P. Carrier; Irving M. Weiner

[57] ABSTRACT

A tree stabilizer device for supporting young trees, shrubs, etc. The device includes a post adapted to have one end thereof inserted into the ground so as to extend upwardly substantially vertically therefrom; and an elongated support member having a first adjustable securing mechanism for securing the member to the post, and a second mechanism for securing the member to a tree. The first securing mechanism includes a slot defined through the member and shaped substantially to match a cross-section of the post, for insertion of the post therethrough. The second securing mechanism includes a substantially wedge-shaped section and a wedge for adjustable insertion therein so as to secure a portion of the tree between the wedge and the wedge-shaped section.

13 Claims, 1 Drawing Sheet

U.S. Patent        July 25, 1995        5,435,097
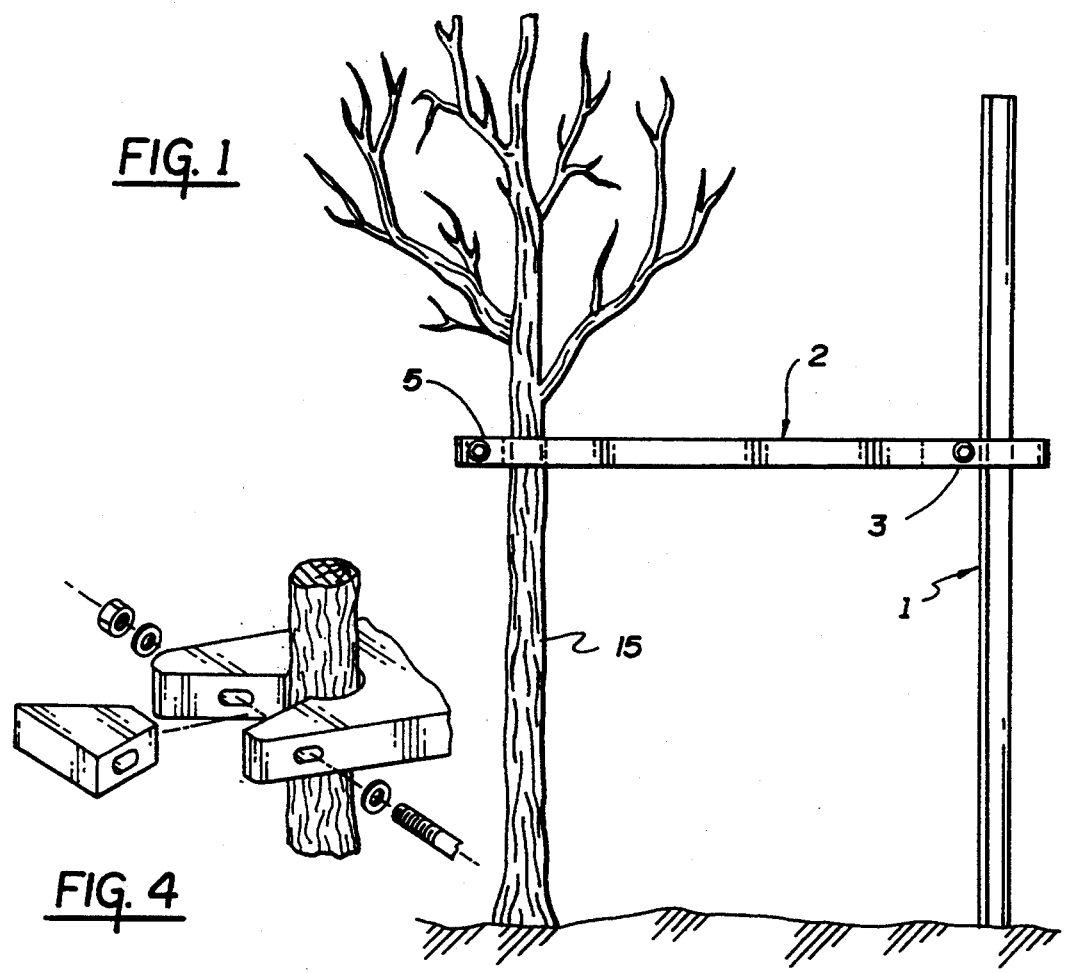
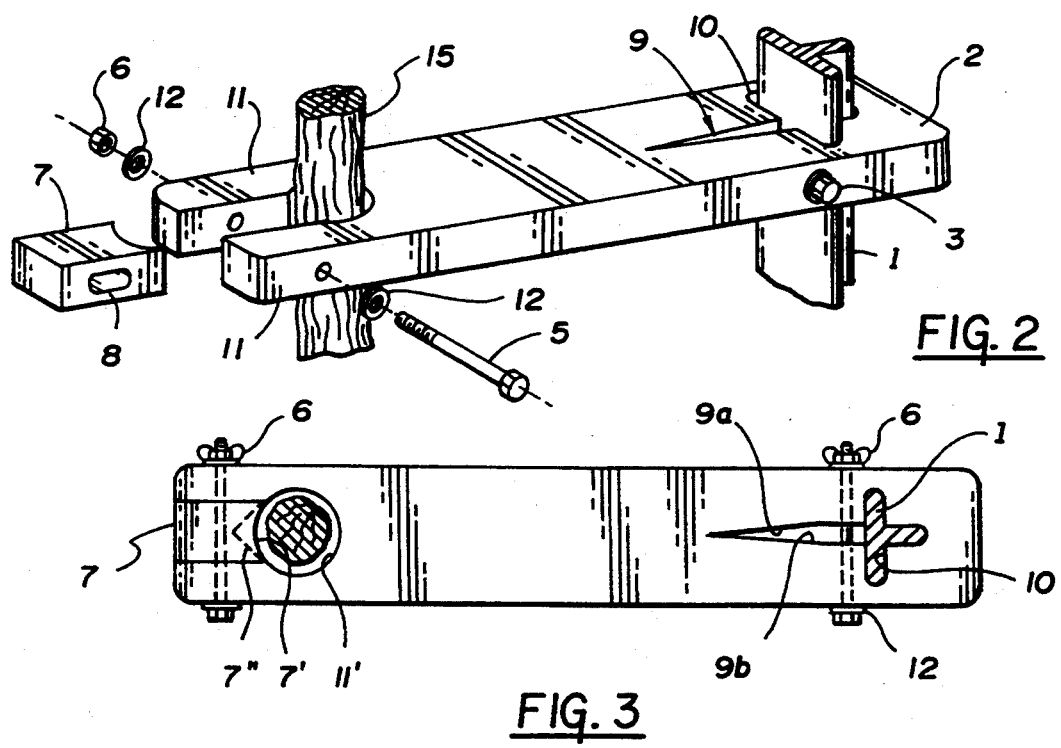

TREE STABILIZER APPARATUS, AND METHODS OF CONSTRUCTING UTILIZING SAME

BACKGROUND OF THE INVENTION

1. Field of Invention

This invention relates to a tree support device and particularly to an economical, adjustable tree stabilizer apparatus for providing upright support to young trees and shrubs.

2. Description of the Relevant Art

There are known inventions for supporting trees or scrubs. For example, Shisler U.S. Pat. No. 3,521,401 discloses a tree support unit including a stake and a horizontal member having a flexible, nonabrasive strap for securing to the tree trunk. The Shisler patent, however, fails to provide a support device including means for easily adjusting the height of its horizontal member relative to the stake.

Williams U.S. Pat. No. 4,480,403 discloses a tree support device, including a horizontal member having means for securing to a vertical T-post and a circular collar portion for attaching to a tree. The Williams invention, however, is relatively complex, expensive, and fails to disclose a tree support device that is adapted to support trees having a wide range of trunk diameters effectively.

Reisner U.S. Pat. No. 4,307,540 discloses a tree display device which includes a horizontal member having means for tieing a tree thereto. The Reisner device, however, is also relatively complex and expensive, and fails to include a vertical member having means for efficient and quick insertion into the ground, or means for firmly securing the horizontal member to the device in adverse weather conditions.

Staudt U.S. Pat. No. 4,299,052 discloses a tree anchoring device having a tie-down mechanism for securing its horizontal member to a tree. The invention, however, fails to provide a tree support device that includes means for firmly securing to a tree.

Ise U.S. Pat. No. 3,010,256 discloses a tree support device including a biased, circular wire to wrap around the tree. The Ise device, however, is again relatively complex and expensive, and fails to provide a tree support device which effectively firmly supports trees having a wide variety of trunk sizes.

Bell U.S. Pat. No. 2,501,255 provides a tree support having a circular jacket assembly for attachment to a tree. The invention, however, fails to provide a tree support device having a single anchor means for embedding into the ground.

SUMMARY OF THE INVENTION

The present invention overcomes the above-discussed limitations and shortcomings of known tree support devices and generally satisfies a significant need for a tree and shrub support device that is sturdy in construction and weather resistant, firmly holds trees having a wide range of both heights trunk diameters, quickly and easily assembles and disassembles for minimal maintenance thereof, and is simple and economical to manufacture.

According to the present invention, there is provided a tree support device which includes an elongated post that is adapted to have one end thereof inserted into the ground so that the post extends substantially vertically therefrom; an elongated support member having a first means, located at one end thereof, for securing to the post so as to extend substantially perpendicularly therefrom, and a second means, located at the second end thereof, for securing to a tree. The first securing means preferably includes a first slot defined through the support member and shaped to receive said post therethrough, and means for compressing the sides defining the first slot, so that the sides clamp the support member to the post. The second securing means preferably includes a wedge-shaped opening formed integrally with the second end of the support member, a wedge for adjustable insertion in the wedge-shaped opening, and means for adjustably securing the wedge within the wedge-shaped opening.

In use, one end of the post is first inserted into the ground near the desired tree. Next, the support member is secured to the vertical post by sliding the first slot of the support member over the post until the support member reaches its desired elevation, while the tree is initially positioned within the wedge-shaped opening of the second securing means. Then the support member is firmly secured to the post by extending a bolt laterally through the support member and tightening it with a nut, which causes the inner sides of the first slot to compress against and clamp to the post. Thereafter, the tree is firmly secured by the second securing means of the support member by inserting the wedge within the wedge-shaped section, extending a bolt through the wedge and the end of the support member defining the wedge-shaped opening, and tightening the bolt with a nut. The position of the wedge within the wedge-shaped opening is selectively dependent on the diameter of the tree trunk being secured.

It is an object of the invention to provide a tree support device that is quickly and easily assembled, secured to the ground, and attached to a tree.

It is another object of the invention to provide a tree support device that is adapted to firmly support trees, shrubs, and the like having a wide variety of trunk diameters, and which is easily adjustable to accommodate any given tree, shrub, etc.

Still another object of the invention is to provide a tree support device that can be easily and economically manufactured from a molded, weather resistant material.

Other objects, advantages and salient features of the present invention will become apparent from the following detailed description, which, when taken in conjunction with the annexed drawings, discloses a preferred embodiment of the present invention.

BRIEF DESCRIPTION OF THE DRAWINGS

FIG. 1 is a side elevational view of a preferred embodiment of the present invention supporting a tree.

FIG. 2 is a perspective view of the horizontal member of a preferred embodiment of the present invention showing attachment to the vertical T-post and to a tree.

FIG. 3 is a top elevational view of a preferred embodiment of the present invention supporting a tree and attached to the vertical T-post.

FIG. 4 shows a modification of one end of the device in FIG. 2.

DETAILED DESCRIPTION OF THE PREFERRED EMBODIMENTS

Referring to FIGS. 1–3, there is shown a tree support device according to the present invention, including elongated post 1, wedge 7, and support member 2 having a first means for securement to post 1, and a second means for securement to the tree trunk. Post 1, support member 2, and wedge 7 are preferably substantially made from a rigid plastic compound so that it is weather resistant and economically produced, such as by injection molding. Any of these components may alternatively be made of other economically produced and weather resistant materials, such as fiberglass, wood, stiff rubber, aluminum, etc.

Elongated post 1 is adapted to have one end inserted into the ground so as to provide fixed anchorage of the tree support device. Post 1 preferably has a T-shaped cross-section so as to provide stable and solid engagement with support member 2 and which prevents member 2 from rotating relative to the post, but alternatively post 1 may have a cross-section of any other desired shape, such as circular, square, and other polygonal shapes. The height of vertical post 1 is preferably sized so as to provide ample adjustable support over a wide range of elevations, such as from 2'-6', and will preferably be sufficiently strong and rigid to permit it to be hammered into the ground. Optionally, post 1 includes a tapered end for easy insertion in the ground.

Elongated support member 2 is adapted to secure to post 1 at one end and to the desired tree, shrub, etc. at its second end. Member 2 will preferably be of a suitable length to accommodate different uses, such as 1'-3', and will preferably have a greater width than depth.

As shown in FIGS. 2 and 3, the first securing means preferably includes a slot 10 for the insertion of post 1 therethrough. Preferably, slot 10 is shaped substantially as the cross-section of post 1 so as to stably mate therewith and to allow horizontal support 2 to easily yet stably slide therealong for adjustable elevational tree support. In addition, the first securing means includes another slot 9, situated adjacent to slot 10 on support member 2 so that slots 9 and 10 form a single aperture therethrough. Slot 9 is preferably defined in part by inner sides 9a, 9b which are in a spaced and tapered relation to each other at vertical slot 10, as shown in FIGS. 2 and 3.

Further, the first securing means of support member 2 includes an appropriate clamping means, such as bolt 3 and nut 6 (FIG. 3), which operate to tightly secure support member 2 in a fixed position along post 1. Bolt 3 is preferably adapted to be laterally inserted through support member 2 so as to pass through inner sides 9a and 9b of slot 9. Nut 6 secures to the threaded end of bolt 3, and will preferably be a conventional nut or a wing nut for easy manual tightening of bolt 3.

According to a preferred embodiment, and due to the resilient nature of the plastic used in forming member 2, support member 2 is easily secured in a fixed position along post 1 by simply tightening nut 4 on bolt 3, which causes the inner sides of slot 10 to tightly compress around post 1. Such compression is significantly facilitated due to the presence of slot 9, whose inner sides 9a and 9b are urged in a closer spaced relationship than when horizontal member 2 is not subjected to any tightening by nut 6. Preferably, washers 12, such as lock washers, are positioned between nut 6 and horizontal member 2, and between bolt 3 and horizontal member 2 to maintain member 2 in a compressed position without any excessive wear thereon.

Member 2 further includes a second securing means, situated at its opposite end, for securing to a tree trunk, tree limb, shrub, etc. As shown in FIGS. 2 and 3, the second securing means preferably comprises a substantially wedge-shaped section or recess formed integrally with the second end of support member 2. The wedge-shaped section comprises prongs 11 and an inner, substantially circular recess 11' defined between the inner ends of the prongs. In this embodiment, the tree trunk will preferably be inserted within the wedge-shaped section adjacent recess 11' for securement therewithin. The recess 11' at the inner ends of prongs 11 preferably, but not necessarily, is larger in diameter than the gap between the outer ends of prongs 11.

The second securing means of support member 2 additionally includes wedge piece 7, which is adapted for insertion within the wedge-shaped section following the insertion of the tree trunk therewithin. Slot 8 is preferably laterally disposed along and through wedge 7. An inner end 7' of wedge piece 7 is preferably concave so as to cooperate with the circular recess 11' in surrounding the tree 15. Alternatively the inner end of the wedge piece 7 may be wedge shaped as indicated by the dotted line 7" in FIG. 3. The wedge surface 7" securely engages the surface of the tree 15.

The second securing means of support member 2 attaches to the desired tree trunk in a fixed engagement therewith by the tightening of bolt 5, which is laterally inserted through openings defined in prongs 11 and through slot 8 in wedge 7. In this way, after the tree trunk is inserted within the wedge-shaped securing means followed by the adjustable positioning of wedge 7 therein, tightening of nut 6 on the threaded end of bolt 5 locks wedge 7 into place. Again, nut 6 is preferably a conventional nut or a wing nut for easy manual tightening on bolt 5. In addition, washers 12, such as lock washers, are preferably situated between nut 6 and prong 11, and between the head of bolt 5 and the second prong 11 to maintain nut 6 in a tightened position on bolt 5.

In use, post 1 is first partially embedded into the ground near the tree desired to be supported so as to extend substantially vertically outwardly therefrom. Next, member 2 is slid over post 1 and positioned therealong at the desired elevation, and the tree trunk, limb, shrub, etc. is positioned within the second securing means of support member 2. Then support member 2 is locked in a fixed position along post 1 by inserting bolt 3 laterally through horizontal member 2 and vertical slot 9 thereof, and tightening nut 4 on the threaded end of bolt 3, which is extended outwardly from support member 2. Tightening nut 4 causes the sides defining slot 10 of member 2 to tightly compress around post 1, thus locking it in place. Thereafter, wedge 7 is inserted between prongs 11 of the second securing means and positioned in the desired location relative to the previously-inserted tree trunk. Lastly, bolt 5 is laterally inserted through prongs 11 and slot 8 of wedge 7, and nut 6 is tightened on the outwardly extending end of bolt 5 so as to firmly fix wedge 7 into place.

In a preferred embodiment of the present invention, wedge 7 is adjustably positioned between prongs 11, with its final position therein being dependent in part upon the size of the tree trunk and the width of slot 8. When securing trees having trunks of larger diameters relative to the wedge-shaped second securing means, wedge 7 will preferably be positioned substantially towards the outer ends of prongs 11; while when securing trees having trunks of smaller sized diameters relative to the wedge-shaped second securing means, wedge 7 may be inserted closely adjacent to the inner ends of prongs 11 and circular recess 11'.

Due to the resilient nature of the plastic-manufactured support device, the wedge-shaped second securing means of support member 2 may optionally have prongs 11 which are slightly flexible in nature so as to accommodate trees having wider and narrower diameter trunks relative to the wedge-shaped second securing means. In this way, as the tree trunk is inserted within the wedge-shaped second securing means, prongs 11 protrude slightly angularly as needed; or, as the tree trunk grows in size over time, prongs 11 protruded angularly outwardly as needed.

Further, wedge 7 and prongs 11 may alternatively have sides which taper inwardly, as shown in FIG. 4.

Although there have been described what is at present considered to be the preferred embodiments of the present invention, it will be understood that the invention can be embodied in other specific forms without departing from the spirit or essential characteristics thereof.

The described embodiment is, therefore, to be considered in all aspects as illustrative, and not restrictive. The scope of the invention is indicated by the appended claims rather than the foregoing description.

I claim:

1. A tree support device for cooperating with a post partially inserted into the ground and extending upwardly substantantially vertically therefrom, the device comprising:
    an elongated support member;
    a first means located at a first end of said support member for selectively securing said member sound a post so as to extend perpendicularly therefrom;
    said first securing means including an opening, defined through said first end of said support member having a shape substantially matching a full cross-sectional shape of the post such that said first end of said support member slidably receives the post;
    a secured means, located at a second end of said support member, for selectively securing said member to a tree;
    said second means including a substantially wedge-shaped recess formed integrally with said second end, and wedge means for adjustable insertion into said wedge-shaped recess so as to secure a portion of the tree between said wedge means and said wedge-shaped recess;
    compressing means for selectively compressively collapsing surfaces of said support member defining said opening inwardly around said post so as to maintain a fixed position thereon;
    said compressing means including a slot defined through said support member adjacent said opening, and having first and second inner sides which terminate at said opening; and
    said first and second inner sides being spaced a first distance from one another at said opening in an uncompressed state, and spaced a distance smaller than said first distance when said compressing means compresses said first and second inner sides.

2. A tree support device as recited in claim 1, wherein:
    said compressing means includes a bolt inserted laterally through said first end of said support member and through said first and second inner sides of said slot, and a nut threadingly attached to one end of said bolt.

3. A tree support device as recited in claim 1, wherein:
    said support member is formed of a unitary piece of resilient plastic material, and said opening, said slot, and said wedge-shaped recess are defined integrally therein.

4. A tree support device as recited in claim 1, wherein:
    said wedge means includes a slot defined laterally therethrough; and
    said bolt is insertable through said slot of said wedge means so as to position said wedge means in any of a range of positions within said wedge-shaped recess.

5. A tree support device as recited in claim 1, wherein:
    said wedge-shaped recess of said second securing means includes two prongs defining said wedge-shape; and
    said prongs are flexible laterally relative to said support member so as to accept trees having a variety of diameters.

6. A device as recited in claim 1, wherein:
    said second securing means includes a forked section and a wedge means for insertion into said forked section so as to secure a portion of the tree between said forked section and said wedge means.

7. A device as recited in claim 6, wherein:
    said second securing means includes a means for adjustably fixing said wedge means within said forked section.

8. A tree support device for cooperating with a post partially inserted into the ground and extended upwardly substantially vertically therefrom, the device comprising:
    an elongated support member;
    a first means located at a first end of said support member, for selectively securing said member around a post so as to extend perpendicularly therefrom;
    a second means, located at a second end of said support member, for selectively securing said support member to a tree;
    compressing means for compressively collapsing surfaces of said support member defining said opening inwardly around said post so as to maintain a fixed position thereon;
    said first securing means including an opening, defined through said fast end of said support member, having a shape substantially matching a cross-sectional shape of the post such that said first end of said support member slidably receives the post therethrough;
    said second securing means including a forked section, a wedge means for insertion into said forked section so as to secure a portion of the tree between said forked section and said wedge means and means for adjustably fixing said wedge means within said forked section;
    said forked section including a plurality of prongs defining a wedge shape;
    said wedge means comprising a wedge member including a slot defined laterally therethrough; and
    said fixing means of said second securing means including a fastening member laterally insertable through said prongs and said slot of said wedge member so as to selectively fix said wedge member in any of a range of positions within said forked section.

9. A device as recited in claim 8, wherein:
said prongs are flexible laterally relative to said support member so as to accommodate a wide variety of tree diameters.

10. A device as recited in claim 8, wherein:
inner edges of said prongs taper outwardly; and
sides of said wedge member taper inwardly so as to correspondingly engage with said tapered edges of said prongs.

11. A device as recited in claim 8, wherein:
said support member is formed of a unitary piece of resilient plastic material.

12. A tree support kit comprising:
a post adapted to have one end inserted into the ground so as to extend upwardly and substantially vertically therefrom, said post having a non-circular cross section;
an elongated support member having an opening defined through a first end thereof, said opening being shaped to receive said post slidingly therethrough, and a recess defined in an opposite end thereof, said recess being shaped to engage a tree surface therein;
means for compressively collapsing surfaces defining said opening around said post so as to clampingly fix said first end of said support member to said post; and
wedge means for being adjustably attached to said opposite end of said support member for securing the tree surface within said recess;
said opening being shaped so as to substantially completely surround a section of said post;
said collapsing means including a slot defined through said support member adjacent said opening, and having first and second inner sides which terminate at said opening;
said first and second inner sides being spaced a first distance from one another at said opening in an uncollapsed state, and spaced a distance smaller than said first distance when said collapsing means collapses said opening; and
said recess being tapered such that it is wider at an outer end thereof and adapted to engage the tree surface at an inner end thereof;
said wedge means including a wedge-shaped member adapted to be slidingly fitted in said tapered recess and means for adjustably, selectively securing said wedge-shaped member in any of a plurality of positions along said recess;
said adjustable securing means including a slot defined laterally through said wedge-shaped member and a fastener insertable through said slot of said wedge-shaped member so as to position said wedge-shaped member in any of said plurality of positions within said recess.

13. A device as recited in claim 1, wherein said opening is substantially T-shaped for receiving a T-shaped post therethrough; and
said surfaces of said support member defining said slot are spaced, longitudinally along an axis of said support member, from the post as when the elongated support member is secured thereto.

* * * * *